United States Patent
Kelm et al.

[11] Patent Number: 5,983,658
[45] Date of Patent: Nov. 16, 1999

[54] AUTOMOTIVE AIR CONDITIONING

[75] Inventors: Brian Robert Kelm, Northville, Mich.; Roderick Donald Taylor, Victoria, Australia

[73] Assignee: Ford Motor Company, Dearborn, Mich.

[21] Appl. No.: 08/854,343

[22] Filed: May 12, 1997

[51] Int. Cl.⁶ .................................. F04B 1/26; F25B 1/00
[52] U.S. Cl. ...................................... 62/228.5; 417/222.2
[58] Field of Search ..................... 62/223.3, 323.3, 62/227; 417/222.2; 236/1 EA

[56] References Cited

U.S. PATENT DOCUMENTS

| | | | |
|---|---|---|---|
| 2,479,170 | 8/1949 | Kuempel | 62/323.3 |
| 2,759,333 | 8/1956 | Atchison | 62/228.5 X |
| 4,132,086 | 1/1979 | Kounty | 62/209 |
| 4,178,135 | 12/1979 | Roberts | 417/222.2 |
| 4,494,383 | 1/1985 | Nagatomo et al. | 236/1 EA |
| 4,539,821 | 9/1985 | Tamura | 62/228.5 |
| 4,606,705 | 8/1986 | Parckh | 417/222 |
| 4,723,416 | 2/1988 | Suzuki | 62/228.5 |
| 4,872,814 | 10/1989 | Skinner et al. | 417/222.2 |

*Primary Examiner*—William Wayner
*Attorney, Agent, or Firm*—Raymond L. Coppiellie

[57] ABSTRACT

An automotive air conditioning system has a continuously running compressor that is cycled between a high capacity mode and a low capacity mode, to achieve a desired cooling of the vehicle passenger compartment without undesired compressor stumble or compressor overheating.

1 Claim, 4 Drawing Sheets

FIXED DISPLACEMENT — VARIABLE CAPACITY

FIXED DISPLACEMENT — VARIABLE CAPACITY
MIN./MODULATED CAPACITY ONLY

//5,983,658

AUTOMOTIVE AIR CONDITIONING

BACKGROUND AND SUMMARY OF THE INVENTION

This invention relates to an automotive air conditioning system that can run continuously, to avoid objectionable "stumble" and compressor overheating problems sometimes associated with conventional systems.

The continuously running system can include a variable capacity compressor that cycles between maximum and minimum capacities without producing excessively high discharge gas temperatures and/or insufficient compressor lubrication flow rates. The invention is particularly designed for situations in which the compressor is located in environments that contribute to high discharge gas temperatures and poor compressor lubrication performance.

In the present invention, the compressor operates at a relatively high capacity when the air conditioning system is in its cooling mode, and at a relatively low capacity when the system has achieved the required cooling. The invention can be applied to various types of compressors, e.g. vane compressors, scroll compressors, swash plate compressors, wobble plate compressors, or screw compressors.

Further features of the invention will become apparent from the attached drawings and description of various arrangements embodying the invention.

DESCRIPTION OF A PREFERRED EMBODIMENT OF THE INVENTION

Figure 1:
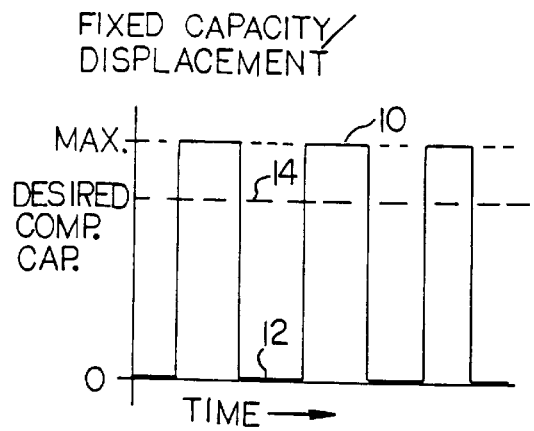
FIG. 1 is a chart illustrating the performance of a conventional automotive air conditioning system.

FIG. 1 shows the performance of a conventional automotive air conditioning system with a fixed displacement compressor. The refrigerant compressor cycles between a high capacity condition 10 and a zero capacity (off) condition 12. Typically, the compressor is belt-driven from the vehicle engine, via an electro-magnetic clutch. The clutch is engaged to transmit a rotary drive force to the compressor drive shaft to achieve the high capacity condition 10, or disengaged to disconnect the compressor drive shaft from the drive belt and achieve the zero capacity condition 12.

Figure 3:
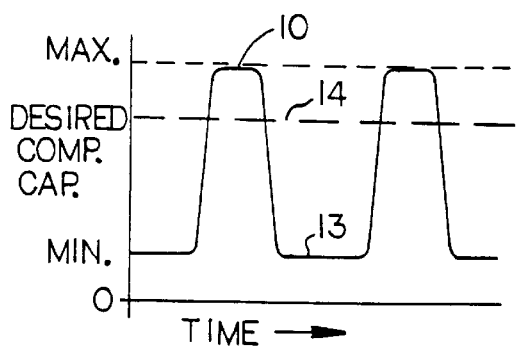

FIG. 3 depicts the performance cycle of a system embodying the present invention. The compressor runs continuously, as depicted in FIG. 3, so that some refrigerant is always flowing through the compressor. As shown in FIG. 3., the compressor is cycled between the maximum capacity 10 and a "low" capacity 13, substantially less than the capacity required to meet the vehicle interior cooling demand. Low capacity 13 can fall between ten and twenty percent of capacity 10. The cycle depicted in FIG. 3 eliminates or greatly minimizes the stumble problem.

Stumble is a condition caused by the torque required to operate the compressor, and the effect on the vehicle power train. Clutch engagement or disengagement produces momentary deceleration or acceleration of the compressor drive shaft. The rotational inertia and associated gas load changes are sometimes termed compressor stumble.

FIGS. 1 and 3 cover equivalent time periods. As shown in FIG. 1, the compressor cycles three times, whereas in the FIG. 3 system the compressor cycles only two times. The minimal air conditioning performance achieved in FIG. 3 when the compressor is in the low capacity condition 13 is sufficient to delay the need for the compressor to go into the high capacity mode. Hence, the FIG. 3 system will advantageously cycle less frequently than the FIG. 1 system.

Figure 2:
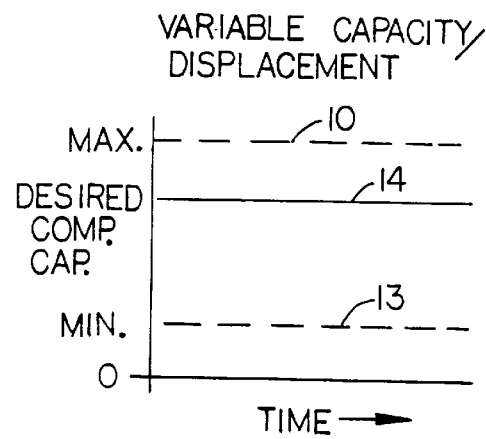
FIGS. 2 through 4 are charts illustrating the performance of air conditioning systems which embody the present invention.

FIG. 2 shows the performance of a different variable capacity compressor required to meet a cooling requirement represented by numeral 14. Depending on the cooling demand, the compressor may operate at the maximum capacity 10 or at some intermediate capacity between capacity 10 and capacity 14.

One problem associated with the FIG. 2 compressor system is heat build-up realized from running in a variable capacity mode. Under some conditions the compressor discharge gas temperature can climb in excess of two hundred fifty degrees Farenheit, so as to degrade the rubber and plastic components of the air conditioning system. Such high temperatures can also adversely affect the lubricants entrained with the refrigerant for lubricating the sliding surfaces in the compressor.

Figure 4:
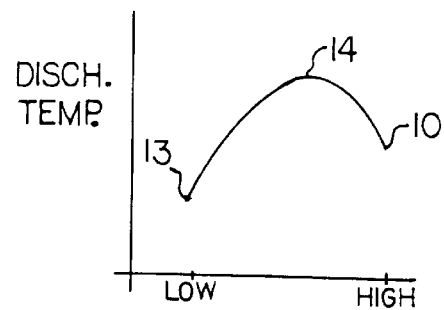

FIG. 4 shows generally how the discharge temperature varies, as a function of the compressor capacity. At intermediate capacity 14 (corresponding to value 14 in FIG. 2) the compressor tends to overheat.

To combat the overheating problem, the present invention stipulates that, at the onset of an overheated condition, the compressor will be put into a cycling mode depicted by FIG. 3. It can be seen from FIG. 4 that when the compressor is operated efficiently in the low capacity mode 13 the gas flowing out of the compressor generates a comparatively small amount of heat. Cycling the compressor between the efficient high capacity mode 10 and low capacity mode 13, while avoiding the intermediate capacity mode 14 at the onset of an overheat situation, tends to achieve an efficient cooling cycle while preventing the compressor from overheating. The surge, or stumble, effect is minimized because the refrigerant load is preferably varied slowly between the high and low capacity, and the inertia effect of stopping and starting the compressor is eliminated.

FIGS. 5 through 9 schematically depict various compressor systems that can be used in conjunction with the invention. In FIGS. 5 through 9 the dashed line 20 represents the compressor housing, the circle area 22 represents the working mechanism or chamber, and the letters S and D represent the suction line and gas discharge line, respectively. FIGS. 5 through 9 illustrate various ways to selectively achieve a relatively high compressor operating capacity (at or near capacity 10) and a low minimum capacity 13.

Figure 5:
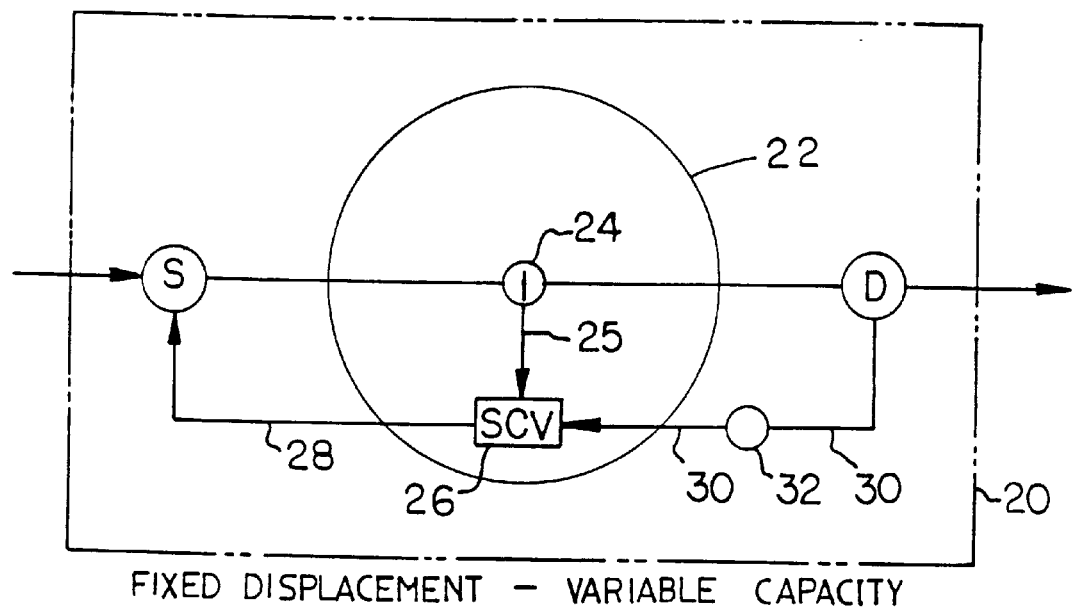
FIGS. 5 through 9 illustrate various arrangements that can be used to vary refrigerant compressor capacity according to the present invention.

As shown in FIG. 5, this compressor has an intermediate pressure chamber 24 between the suction chamber and gas discharge chamber. A passage 25 leads from chamber 24 to a suction control valve 26 that can direct intermediate pressure gas back to the suction inlet via passage 28.

The system of FIG. 5 can be used in various compressors, e.g. scroll compressors, screw compressors, and vane compressors.

The compressor contains an auxiliary passage 30 incorporating a solenoid valve 32. When the compressor is in the high capacity mode the solenoid valve is closed while the suction control valve 26-directs a relatively small recirculation flow from passage 25 into the recirculation passage 28; that flow can range from zero up to some minimal value. When the compressor is in the low capacity mode 13 the solenoid valve 32 is open, such that the suction control valve 26 receives flow from passage 25 and from passage 30. The combined flow from passages 25 and 30 is directed through the recirculation passage 28 to the suction inlet S. The compressor capacity is inversely related to the recirculation flow through passage 28.

The solenoid valve 32 is electrically energized in response to the need for overheat protection and/or satisfaction of the cooling demand (when the system would otherwise be in the off mode). A temperature switch, thermistor, or thermal disk located in the compressor housing can be used to sense the need for overheat protection.

Figure 10:
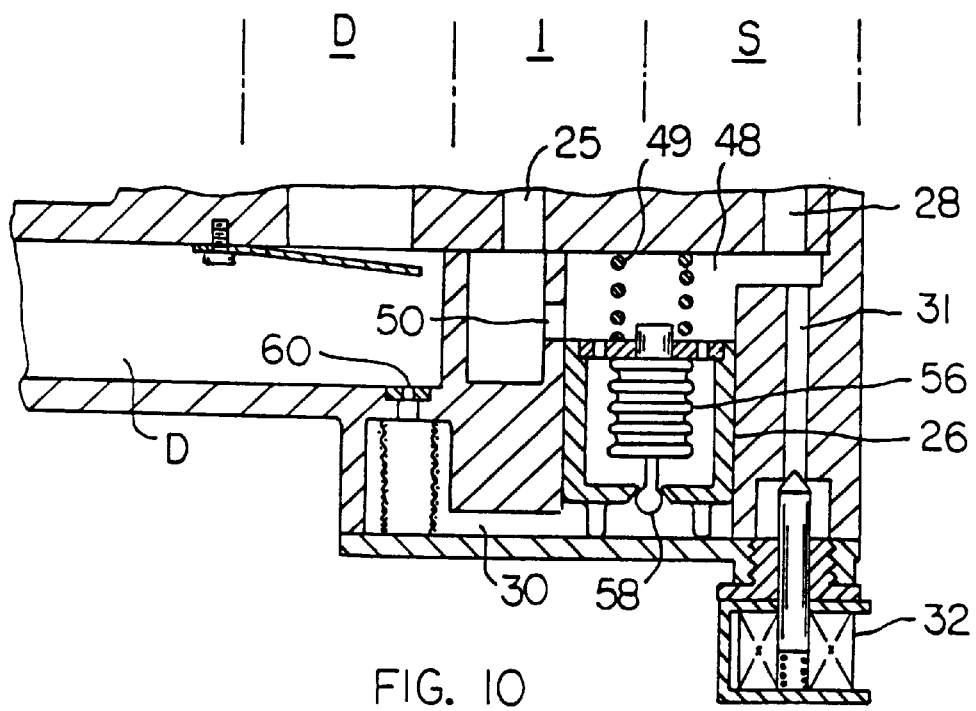
FIG. 10 shows structural details of the suction control valve used in the systems depicted in FIGS. 5 and 6.

FIG. 10 shows a structural arrangement that can be used to incorporate the suction control valve 26 and solenoid valve 32. In FIG. 10, the suction control valve comprises a piston 26 slidable vertically to control gas flow through a port 50 located between passages 25 and 28. Piston 26 houses a sealed bellows 56 that carries a spherical pilot valve 58. The bellows is internally pressurized so as to respond to the suction pressure in chamber 48.

A quantity of pressurized gas is passed from gas discharge space D through passage 30 to exert an upward force on the end wall of piston 26 (when valve 58 is closed); the piston thereby moves upwardly a predetermined amount related to the opposing force of the spring 49. The piston position controls the flow through port 50.

When the suction pressure in chamber 48 is at a relatively low value bellows 56 is enabled to open a valve 58, so that the space 30 below the piston is vented through the port controlled by valve 58. Spring 49 returns the piston 56 to the illustrated position. The piston can take various intermediate positions for modulating the suction pressure within a prescribed range, sufficient to maintain the compressor capacity safely at or near its maximum operating capacity 10 (FIGS. 2 and 3).

When solenoid valve 32 is energized a flow path is opened from discharge space D to suction chamber S. The flow path comprises passages 30 and 31. The size of port 60 between chamber D and passage 30 is selected so that the total recirculation flow through the solenoid valve and port 50 allows the compressor to run at the minimum value 13(FIGS. 2 and 3). As previously noted, compressor operation at the minimum value mitigates the stumble problem and also prevents compressor overheating (under certain conditions).

Figure 6:
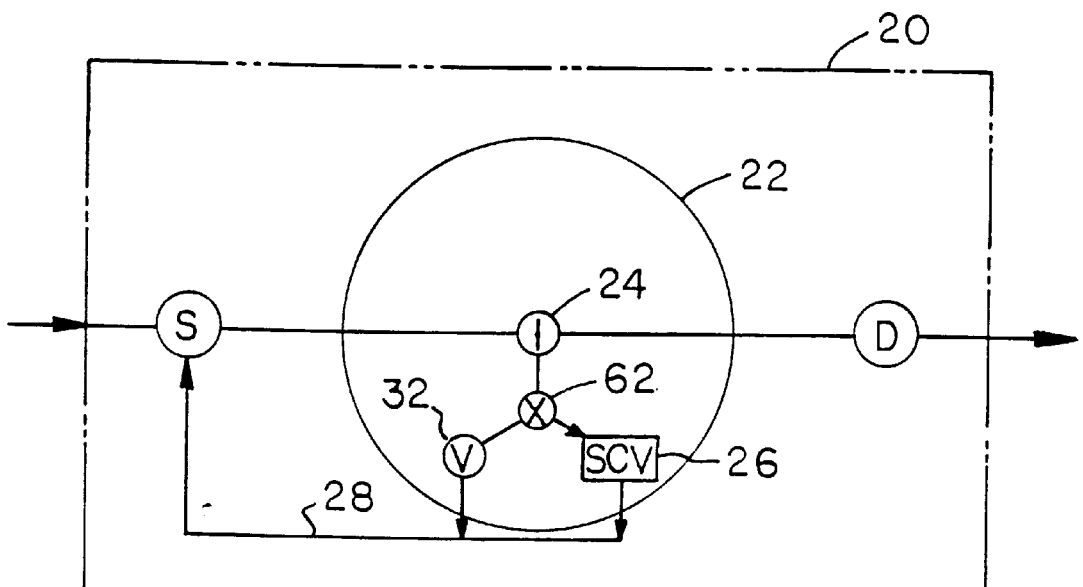
Figure 7:
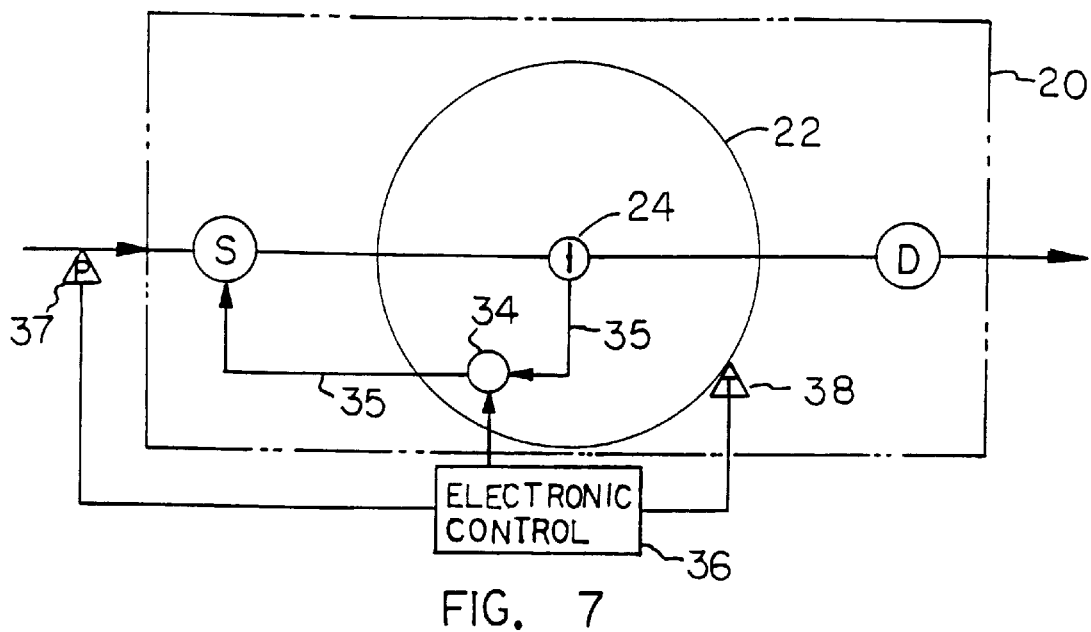

FIG. 6 shows a variant of the general arrangement depicted in FIG. 5. In FIG. 6 the entire recirculation flows is from intermediate chamber 24 to the suction chamber. An electrically operated diverter valve 62 directs intermediate pressure gas into the suction control valve 26 or the recirculation control valve 32. The compressor operates at or near its operating value 10 when valve 62 directs gas to suction control valve 26; the compressor operates at its minimum capacity 13 when valve 62 directs the gas through recirculation valve 32, FIG. 7 illustrates an arrangement wherein the recirculation flow from the intermediate chamber 24 to suction chamber S is controlled by a solenoid valve 34 located in recirculation line 35. Solenoid valve 34 is preferably oscillated between its open and closed positions to vary the recirculation flow on a dither rate basis. The duty cycle of the valve(or time percentage that the valve is open) determines the recirculation flow.

In preferred practice of the invention the valve is controlled by an electronic controller 36 that may operate generally as described in U.S. Pat. No. 4,132,086. The controller may incorporate a temperature sensor 38 for controlling the solenoid valve 34 at the minimum compressor capacity 13 and a suction pressure sensor 37 for controlling the solenoid valve 34 when the compressor is at or near its operating capacity 10.

Figure 8:
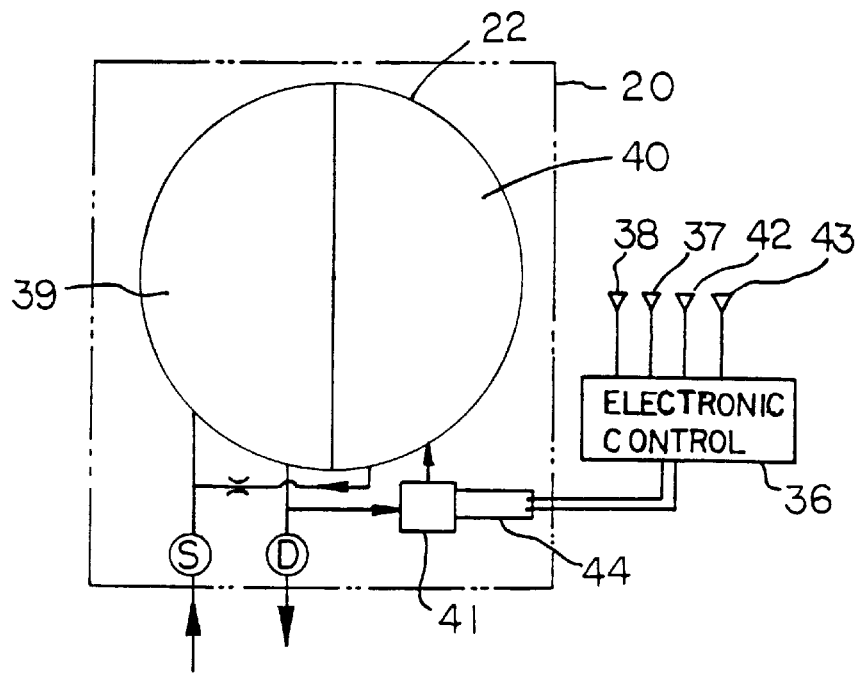

FIG. 8 shows an arrangement particularly applicable for use with wobble plate compressors. As schematically depicted in FIG. 8, the compressor has a piston-cylinder space 39 and a crankcase 40 containing the wobble plate piston drive mechanism. Compressor capacity is related to crankcase pressure. At relatively high crankcase pressures the resistance to piston motion is high, so that the piston stroke is limited; the compressor capacity is thus relatively low. At relatively low crankcase pressures the compressor capacity is relatively high.

In the FIG. 8 system the crankcase is pressurized by diverting a small quantity of pressurized gas from the compressor chamber D through a metering valve 41 that is connected to the crankcase. Increasing the flow through metering valve 41 raises the crankcase pressure; decreasing the flow lowers the crankcase pressure.

The metering valve 41 can be operated by a linear motor, e.g. a linear variable displacement transformer 44 energized by an electronic controller 36. The controller can be controlled or triggered by various sensors, e.g. a temperature sensor 38 responsive to compressor temperature, a pressure sensor 37 responsive to suction pressure, an ambient temperature sensor 42, and an engine r.p.m. sensor 43. The control system depicted in FIG. 8 enables the compressor capacity to be selectively set at the high operating value 10 or the minimum value 13.

Figure 9:
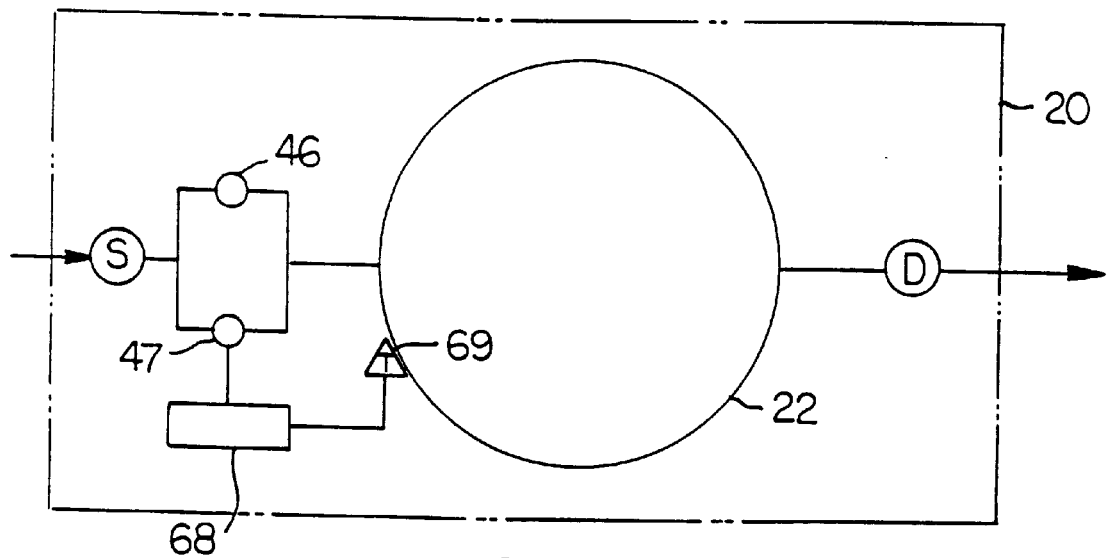

FIG. 9 schematically shows a further form of the invention wherein compressor capacity is controlled by restricting the mass of refrigerant initially supplied to the compressor. The control system comprises a restriction 46 and a solenoid valve 47 arranged in parallel flow relationship. The passages are sized so that when the solenoid valve is closed the flow rate through restriction 46 causes the compressor to operate at its minimum capacity 13. When the solenoid valve 47 is opened the combined flow through restriction 46 and the solenoid value causes the compressor to operate at or near its operating valve 10(FIG. 3).

The valve can be operated by a suitable control device 68 having a temperature sensor 69 responsive to the compressor temperature(or temperature range).

The drawings show various systems for selectively operating an automotive air conditioner compressor in a relatively high capacity range 10 or a relatively low minimum capacity 13. The compressor preferably operates continuously at either the high capacity or minimum capacity while the system is in the operating mode. The system minimizes the stumble and overheating problems.

What is claimed is:

1. An automotive air conditioning system comprising; a continuously running refrigerant compressor; and control means responsive to cooling demand for operating said compressor at a relatively high capacity; said control means being responsive to satisfaction of the cooling demand for operating said compressor at a relatively low capacity greater than zero but substantially less than the high capacity, whereby said control means avoids operating the compressor in an intermediate capacity range between high capacity and low capacity; said compressor being a wobble plate compressor that includes multiple pistons, a crankcase, and piston drive means in said crankcase; said control means comprising means for varying the pressure in said crankcase.

* * * * *